G. T. KLEVEN.
JACK FOR POWER OPERATED SHOVELS.
APPLICATION FILED NOV. 19, 1912.
1,067,038.
Patented July 8, 1913.
2 SHEETS—SHEET 2.
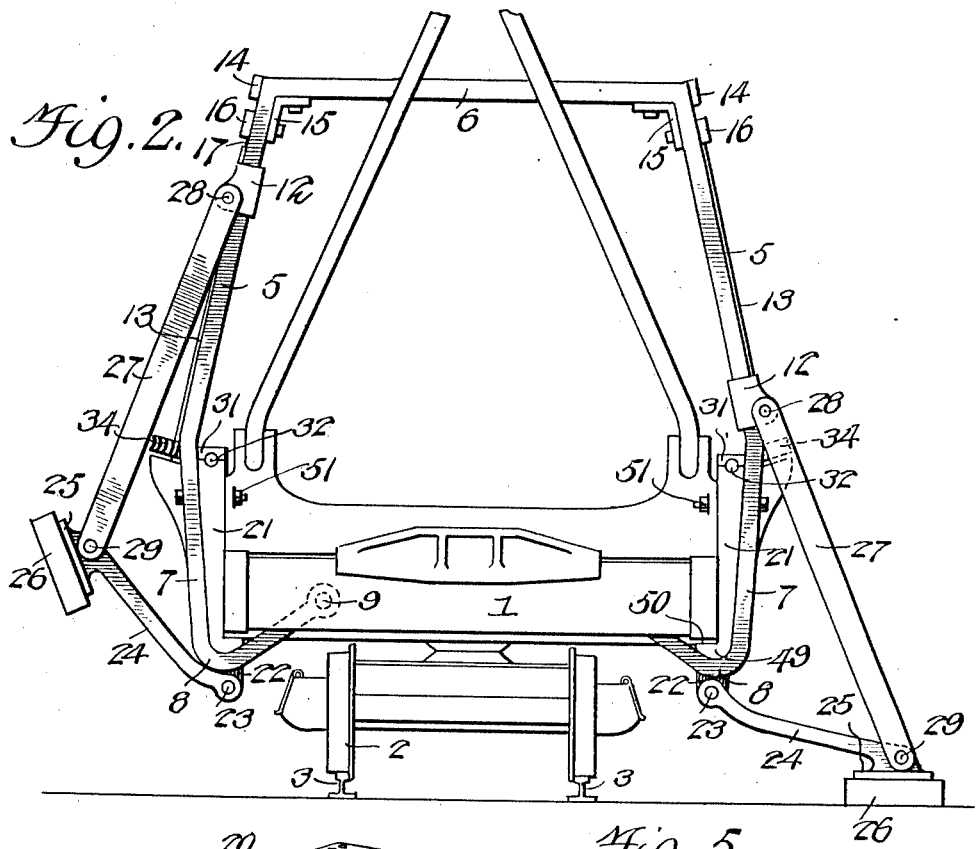
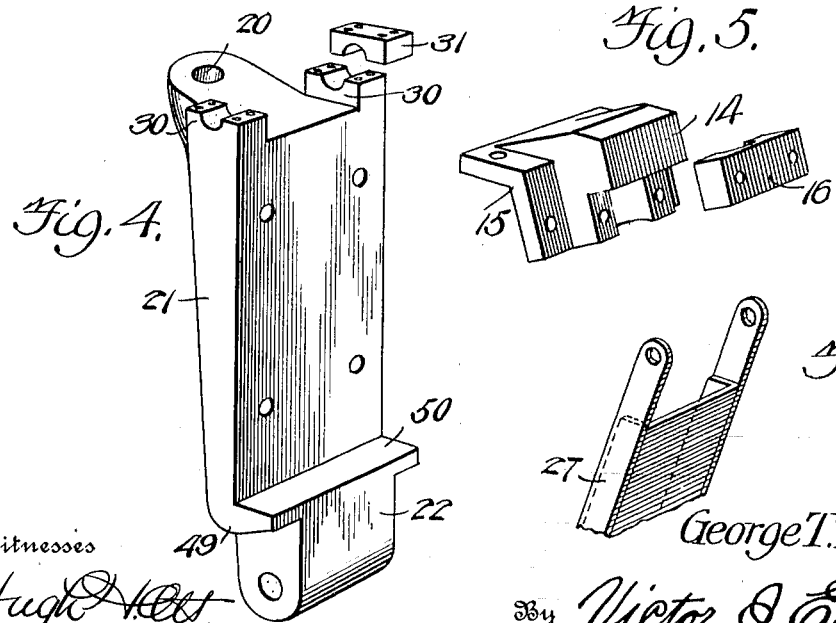
Witnesses
Inventor
George T. Kleven
By Victor J. Evans
Attorney

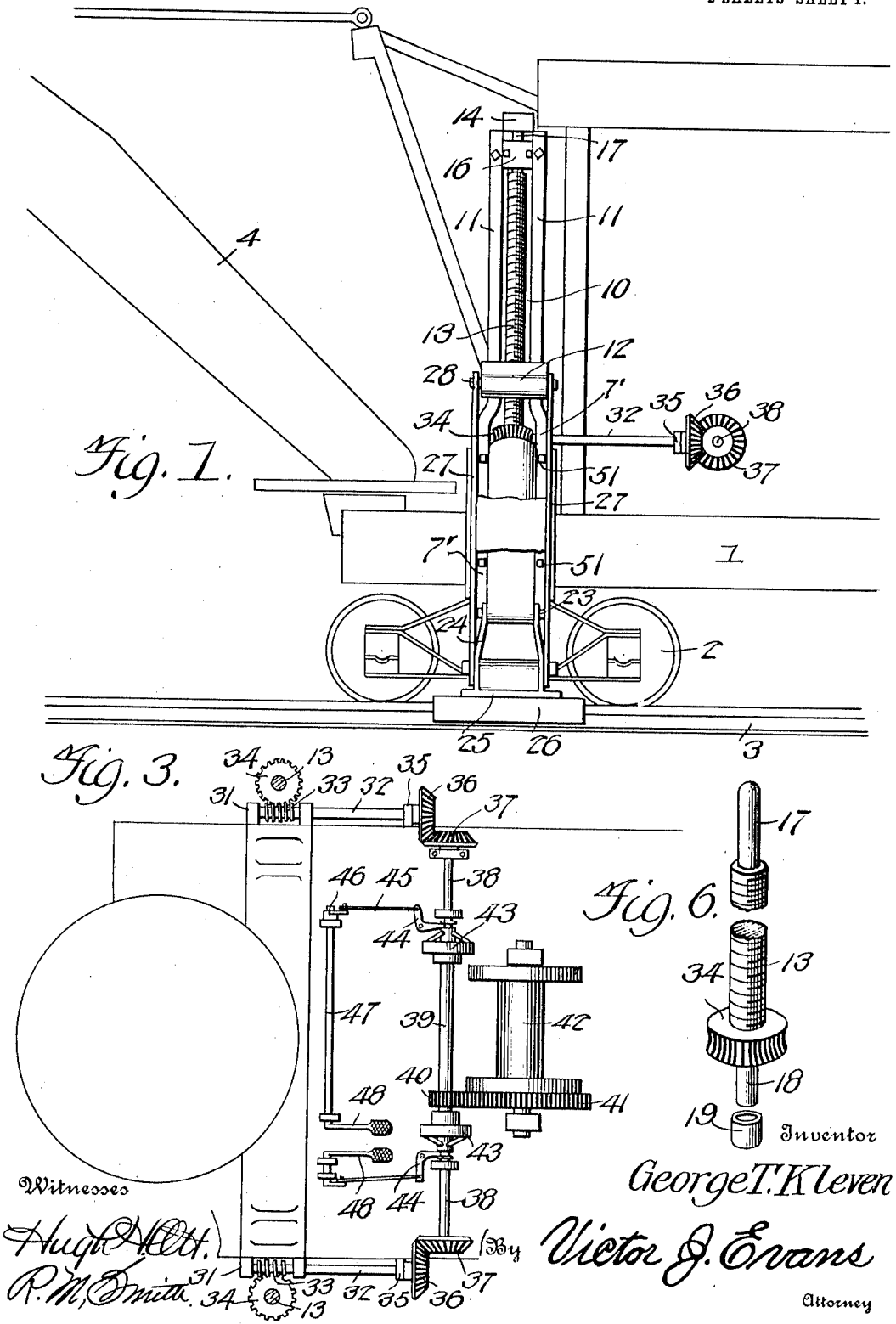

UNITED STATES PATENT OFFICE.

GEORGE T. KLEVEN, OF WINESAP, WASHINGTON.

JACK FOR POWER-OPERATED SHOVELS.

1,067,038.   Specification of Letters Patent.   Patented July 8, 1913.

Application filed November 19, 1912. Serial No. 732,258.

*To all whom it may concern:*

Be it known that I, GEORGE T. KLEVEN, a citizen of the United States, residing at Winesap, in the county of Chelan and State of Washington, have invented new and useful Improvements in Jacks for Power-Operated Shovels, of which the following is a specification.

This invention relates to jacks for power operated shovels, the object in view being to provide a lifting jack which may be applied to the truck of the ordinary steam shovel at present in use, the said jack as a whole embodying a truck suspension frame, combined with one or more supporting arms and operative connections therefor controlled by the power plant of the shovel, whereby the supporting arms may be depressed and elevated.

A further object of the invention is to so arrange the supporting arms of the jack that they will provide a broad bearing and anchorage for the wheeled truck of the steam shovel and obviate any liability of the steam shovel to turn over, or for the wheels of the truck to roll upon the track rails upon which they rest.

With the above and other objects in view, the invention consists in the construction, combination and arrangement of parts, as will be hereinafter more fully described, illustrated in the accompanying drawings, and pointed out in the claim hereunto appended.

In the drawings: Figure 1 is a side elevation of a sufficient portion of a steam shovel to illustrate the application of the present invention thereto. Fig. 2 is an end view of the same. Fig. 3 is a plan view of a portion of the truck, showing the motor actuated means for operating the jack. Fig. 4 is a detail perspective view of the combined bottom step and bracket. Fig. 5 is a similar view of the top step. Fig. 6 is a detail view of one of the jack screws and the parts immediately associated therewith. Fig. 7 is a detail view of the thrust bar.

Referring to the drawings, 1 designates the truck frame of an ordinary motor or steam shovel, 2 designating the carrying wheels at one end thereof, the same being designed to run upon the parallel track rails 3.

4 designates the usual crane arm, by which the shovel is controlled.

In carrying out the present invention, I provide a truck suspension frame which is best illustrated in Fig. 2, wherein it is shown to embrace the truck and extend upward above and across the same, said frame embodying the upwardly converging side bars 5, the top connecting bar 6, and the lower side portions 7 which lie on opposite sides of the truck, and have their lower ends bent inward, as shown at 8, and secured to the truck by bolts 9 passing through eyes in the ends thereof.

Each of the side bars 5 is longitudinally slotted, as shown at 10 in Fig. 1, thereby forming parallel guides 11, between which a runner 12 moves. This runner 12 is threaded to receive a jack screw 13, the upper end of which is journaled in a step 14 having an angle base 15 which is bolted in one of the upper corners of the truck suspension frame, as shown in Fig. 2. The step 14 comprises a detachable cap 16 to admit of the introduction and removal of the jack screw 13, the upper end of which is left smooth to form a journal 17 which fits into the top step. The jack screw 13 is also provided with a smooth journal 18 at the lower end thereof, around which is placed a bearing sleeve or bushing 19 which is received in a socket 20 in a combined bottom step and bracket 21 secured to one side of the truck frame. This combined bottom step and bracket is provided at the lower end thereof with an extension 22, to which is pivotally connected, at 23, a supporting arm 24. This arm is flanged at its outer end, as shown at 25, and has permanently secured thereto a shoe or rest 26 adapted to bear upon the ground, as illustrated in Fig. 2, when depressed by the mechanism hereinafter referred to. Interposed between the runner 12 and the outer end of the supporting arm 24 is a thrust bar 27, the same being pivotally connected, at 28 and 29, to the parts referred to. It will now be seen that when the jack screw 13 is revolved on its longitudinal axis, the runner 12 will be fed lengthwise thereof, and a corresponding movement will be imparted to the thrust bar 27, thereby causing the latter to move the arm 24 around the pivot 23, for the purpose of elevating and depressing the shoe 26.

The bottom step 21 is provided with bearings 30, embodying removable caps 31, in which is journaled a worm shaft 32, the worm 33 of which engages and drives a worm wheel 34 fast on the adjacent jack screw 13. The shaft 32 is mounted in the bearings 35 on the truck frame, and is provided at one end with a miter gear 36 which meshes with a corresponding gear 37 on an extension shaft 38 at one end of a jack operating shaft 39. The shaft 39 is geared by means of a pinion 40 to a larger gear wheel 41 on the hoisting drum 42 of the steam shovel, it being understood that the drum 42 is operated by the engine or motor carried by the shovel. This enables the mechanism of the jack to be operated by the motor of the shovel.

It will be understood that the supporting arm and jack screw arrangement hereinabove described is duplicated at opposite sides of the truck, as clearly shown in Fig. 2, there being two extension shafts 38 for transmitting the power to the worm shafts 32 and thence to the jack screws. In connection with each extension shaft 38 and jack operating shaft 39, a clutch 43 is provided, the same being operated by a bell-crank lever 44, from which a connecting rod 45 leads to a crank 46 on a rock shaft 47 provided with a pedal lever 48, by depressing which the clutch may be thrown into and out of operation. The mechanism just described provides for throwing either one of the jack screws into operation, or if desired, both of the jack screws may be thrown into operation at the same time, the pedal levers 48 being arranged within convenient reach of the operator standing on the platform of the steam shovel. It will further be noted by reference to Figs. 1 and 2 that the lower portions 7 of the side bars of the truck suspension frame are bifurcated, forming branches 7', and just where said branches are bent at the points 8 to extend toward each other under the truck, the bottom step 21 is provided with oppositely projecting shoulders 49, beneath which said branches pass. This serves as an additional support and anchorage for the bottom step 21, upward movement of which is prevented by a shoulder 50 on the step, which extends under one of the longitudinal side bars of the truck frame, as shown in Fig. 2. Said step may also be bolted to the truck by means of bolts 51, and these bolts may also pass through the branch 7', as indicated in Fig. 1.

In Fig. 2 of the drawings, one of the supporting arms 24 is shown in its downward position with the shoe 26 resting upon the ground, while the other supporting arm is shown elevated, this being done to better illustrate the relative position of the two parts under each arrangement. It will be understood that one or both of said arms may be depressed in accordance with the work to be performed, and when in their operative positions, they form a broad bearing and support for the steam shovel as a whole, and not only prevent the side rocking thereof but also prevent the truck from moving on its wheels.

The operation of the jack as a whole is under the immediate control of the engineer.

What is claimed is:

A jack for power-operated shovels, comprising in combination with a shovel truck frame, oppositely arranged brackets, a truck suspension frame embodying side bars which extend under said brackets and are fastened to the truck frame, said side bars forming bracket supporting stirrups and extending upwardly over and across the truck frame, supporting arms pivotally connected to said brackets and extending in opposite directions therefrom, jack screws journaled on said brackets, runners threaded on said screws, thrust bars connecting the runners and supporting arms, and motor operated means for actuating the jack screws independently or simultaneously.

In testimony whereof I affix my signature in presence of two witnesses.

GEORGE T. KLEVEN.

Witnesses:
 JAS. P. HEINE,
 FRED. S. GILMAN.